United States Patent [15] 3,701,924

Glaser [45] Oct. 31, 1972

[54] SYSTEM FOR OPERATING A DISPLAY PANEL

[72] Inventor: David Glaser, Green Brook, N.J.

[73] Assignee: Burroughs Corporation, Detroit, Mich.

[22] Filed: Aug. 17, 1970

[21] Appl. No.: 64,227

[52] U.S. Cl...........315/84.6, 315/169 R, 315/169 TV
[51] Int. Cl...........H03k 23/18
[58] Field of Search..........315/84.6, 169, 169 TV

[56] References Cited

UNITED STATES PATENTS

| | | | |
|---|---|---|---|
| 3,337,683 | 8/1967 | Sliker | 315/169 R |
| 2,847,615 | 8/1958 | Engelbart | 315/84.6 |
| 2,933,648 | 4/1960 | Bently | 315/84.6 X |
| 3,499,167 | 3/1970 | Baker et al | 315/169 R |

*Primary Examiner*—Roy Lake
*Assistant Examiner*—James B. Mullins
*Attorney*—Kenneth L. Miller, Robert A. Green, George L. Kensinger and Charles S. Hall

[57] ABSTRACT

A circuit for scanning a display panel including means for automatically progressing from cell to cell along a row, sensing the arrival at the end of a row and automatically switching to the next row and causing the scanning operation to proceed in the opposite direction to the end of this next row, and thus automatically scanning from row to row and finally sensing the last cell in the panel and resetting the panel and circuit for the start of another complete scanning cycle.

8 Claims, 7 Drawing Figures

INVENTOR.
David Glaser
BY Robert A. Green
ATTORNEY

INVENTOR.
David Glaser

BY

ATTORNEY

SYSTEM FOR OPERATING A DISPLAY PANEL

BACKGROUND OF THE INVENTION

The prior art provides no teaching of a display panel comprising a plurality of gas cells which are specially adapted to be scanned in raster fashion. Such a display panel and arrangement for operating it is described and claimed in copending application Ser. No. 38,408, filed May 18, 1970. The prior art also provides no teaching of a system for operating a multi-cell display panel in raster scan fashion.

SUMMARY OF THE INVENTION

The present invention provides a novel system for operating a display panel and includes means for effectively starting the scanning operation, continuing it in forward and reverse directions along the rows of cells, and then sensing when the scanning operation reaches the end of the panel.

DESCRIPTION OF THE PREFERRED EMBODIMENTS

The system described and claimed herein is intended primarily for operating and scanning cells in a display panel of the type described and claimed in above-identified application, Ser. No. 38,408. This type of panel is shown and described herein as panel 10. Such a panel may have substantially any desired size and shape, and it may include substantially any number of gas cells. The panel may also contain any suitable ionizable gas such as neon, argon, xenon, etc., singly or in combination, and including a vapor of a metal such as mercury to minimize cathode sputtering.

In the following description of the invention, different numbers of cells are shown in various figures for describing the panel itself and for describing the operating system of the invention. For example, the panel structure shown in FIG. 1 has four columns of four cells each. In FIG. 3, a greater number of cells is shown in the schematic representation of the panel and the operating system of the invention.

Figure 1:
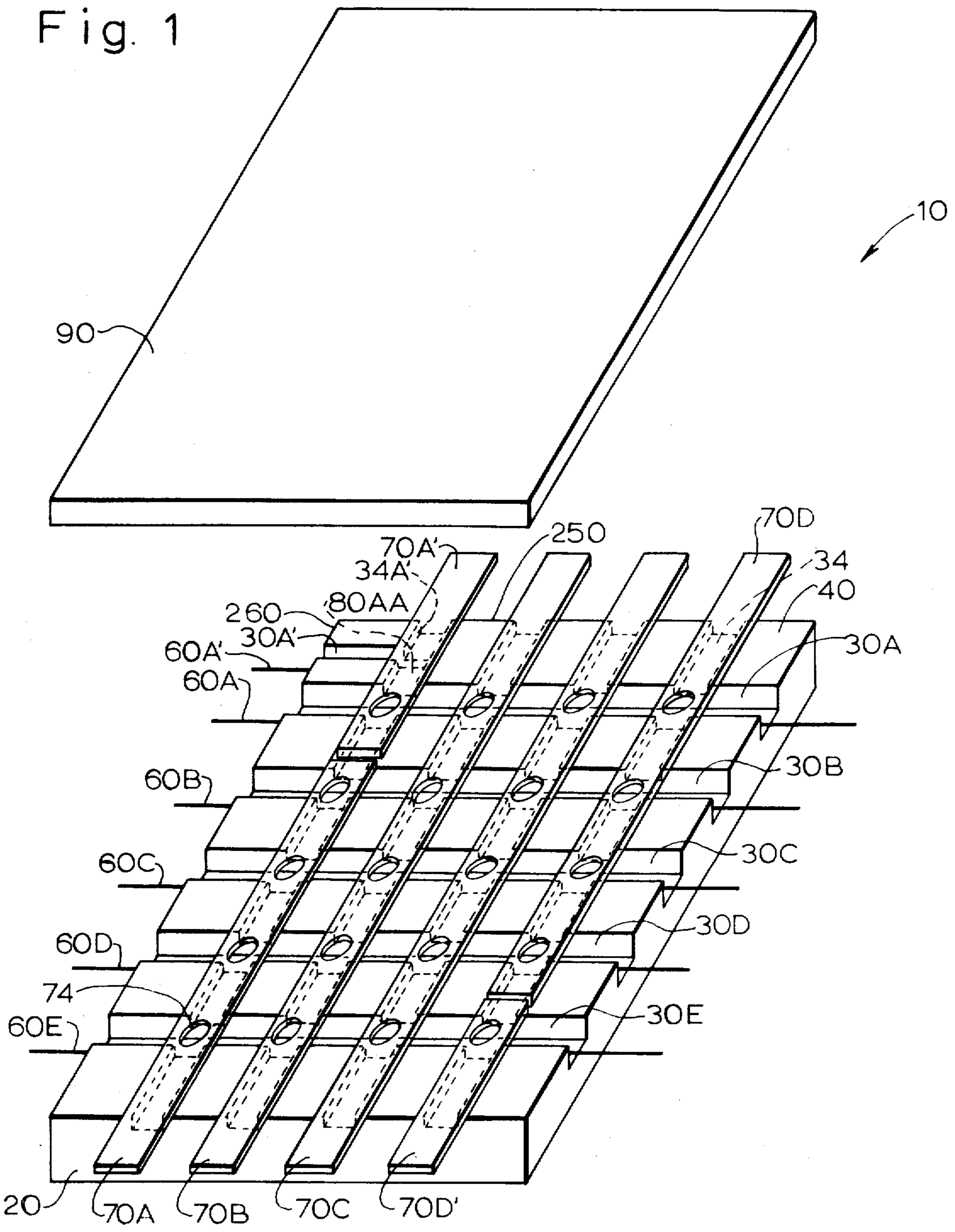
FIG. 1 is an exploded perspective view of a display panel which can be operated by the system of the invention.

Referring to FIG. 1, a display panel 10, operated in accordance with the invention, includes a first insulating bottom plate 20 of glass, ceramic, or the like having a plurality of parallel slots or channels 30 (A, B, C, etc.) formed in the top surface 40 thereof. The slots 30 may have any suitable cross-section, and, for purposes of description, they are considered to be oriented horizontally. A second group of vertical slots 34 are also formed in the top surface 40, and these interconnect horizontal slots 30. Not all of the slots 34 are required for one mode of panel operation to be described below. Plate 20 also includes an auxiliary slot 30A' in the upper left hand corner, as seen in FIG. 1, which extends from the left edge 260 of plate 20 into the first vertical slot 34A'.

Electrodes 60 (A, B, C, etc.), preferably wires used as scanning anodes in one mode of operation, are seated in slots 30. An auxiliary wire anode 60A' is disposed in slot 30A', and it extends into the first vertical slot 34A and into the portion 34A' thereof which lies between horizontal slot 30A and the upper edge 250 of plate 20. Electrodes 60 and 60A' may be secured in place by means of a suitable cement (not shown), if desired.

Figure 2:
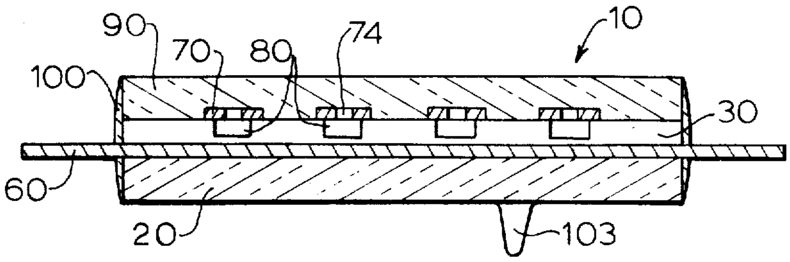
FIG. 2 is a sectional view of the panel of FIG. 1.

Electrodes 70 (A, B, C, etc.) used as scanning cathodes, are seated on or in the top surface 40 of plate 20. The cathode electrodes 70 are preferably flat strips, and each has a series of holes or apertures 74. The cathodes are oriented vertically, parallel to each other, overlaying vertical slots 34, and they are oriented at an angle, preferably 90°, to the anode electrode 60, and each crossing defines a scanning cell 80 (FIG. 2). A cathode aperture 74 is located at each crossing and each cell 80. Each cathode 70 thus lies along a column of cells 80, and each anode 60 lies along a row of cells 80. In addition, each column of cathode apertures lies along a column of cells 80, and each row of cathode apertures, defined by adjacent cathodes, lies along a row of cells 80. Thus, each scanning cell 80 is made up of a portion of an anode 60, the associated portion of cathode 70 above it, and the volume of gas in slot 30 between these electrode portions.

The scanning cells 80 are identified by the anode and cathode which cross them. Thus, the auxiliary cell associated with electrodes 60A' and 70A' is cell 80A'A', and the associated first scanning cell in the first row having electrodes 60A and 70A' is cell 80AA', the second in the same row is 80AB, the third is 80AC, etc. The last cell in the last row is 80ED'. The same reference system is used in FIG. 3.

According to the invention, the first cathode strip 70A is split in the region which lies between slot 30A and slot 30B to provide a first short portion 70A' and an elongated portion 70A. The first portion 70A' overlies vertical slot portion 34A' and extends from between slots 30A and 30B to and beyond the upper edge of the plate 20 and through the panel seal to be described. Cathode portion 70A' has a cathode aperture 74 overlaying slot 30A at cell 80AA. Cathode portion 70A extends from a position spaced from but close to portion 70A' between slots 30A and 30B to the lower edge of the plate 20 and through the panel seal area. It is to be noted that, with this arrangement, cathode 70A' is in operative relation with anode 60A' and anode 60A to, in effect, couple together auxiliary cell or cell portion 80A'A' and the first scanning cell or cell portion 80AA' in the first scanning row. In actuality, cell 80A'A' and cell 80AA' are portions of a single cell which is larger than any of the other cells 80.

The last cathode strip 70A at the right hand edge of plate 20 is also split to include a first long portion 70D which extends from the upper edge of plate 20' to between slots 30D and 30E and a short portion 70D' which extends from between slots 30D and 30E across slot 30D to the lower edge of the plate 20. Cathode portion 70D' includes an aperture 74 overlaying slot 30E and cell 80ED. Cathode 70D and 70D' are close to but spaced and insulated from each other.

Figure 4:
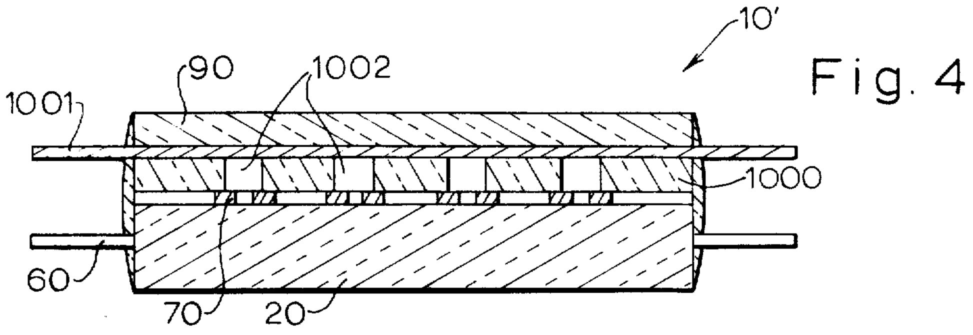
FIG. 4 is a sectional view of a modified display panel embodying the invention.

In one form of the invention, the panel 10 is completed by a cover viewing plate 90 of glass or the like. In the completed panel 10, the plates 20, 90 and the various electrodes are hermetically secured together by a seal 100 (FIGS. 2, 4 and 5) formed along their adjacent edges by any suitable material such as a glass frit, for example, Pyroceram, or the like.

The gas used in panel 10 is introduced in any suitable manner, for example, by means of a bell jar or by means of a tubulation 103 (shown only in FIG. 2), secured to bottom plate 20.

In the description of the operation of the invention set forth below, reference is made to "scanning" or "-glow transfer" from cell to cell. The exact mechanism by which this operation occurs is not known for certain; however, it may involve actual transfer of a mass of glowing ionized gas, or the diffusion of excited particles including metastable states which prime an OFF cell and facilitate the firing thereof, or both mechanisms may be involved.

According to the invention and referring to FIG. 3, to execute a raster scanning operation in panel 10, first cell portion 80A'A' is fired, and then glow is switched into portion 80AA'. Now, the scanning cells 80 in the first or top row are scanned, one at a time beginning with the first cell 80AA and proceeding from cell to cell to the right hand end, from which it proceeds directly vertically to the adjacent second row and then to the left along the second row to the last cell therein, form which it proceeds vertically downwardly to the first cell in the third row, and from there to the end of the third row, and so forth, to the last cell in the plate 20, from which a signal is generated to fire cell portion 80A'A' to initiate another scanning cycle. The system shown in FIG. 3 is used to perform this scanning operation.

The system of the invention utilizes cell-scanning principles described in copending application Ser. No. 850,984, filed Aug. 18, 1969, and the panel described therein has its cathodes connected in three groups, which are described as phases. For convenience, the panel shown in FIG. 3 has its cathodes connected in four groups or phases. The first cathode 70A associated with the first column of cells at the left hand edge of the panel is designated a phase 1 cathode, and every fifth cathode is connected in this group. The other cathodes are connected in the other groups as shown, and the last cathodes 70M and 70M' associated with the last column of cells at the right hand edge of the panel are in the phase 4 group. In addition, the scanning anode electrodes 60 are connected in two groups, with anodes 60A, C, E, etc., being in one group and the others being in the second group.

Figure 3A:
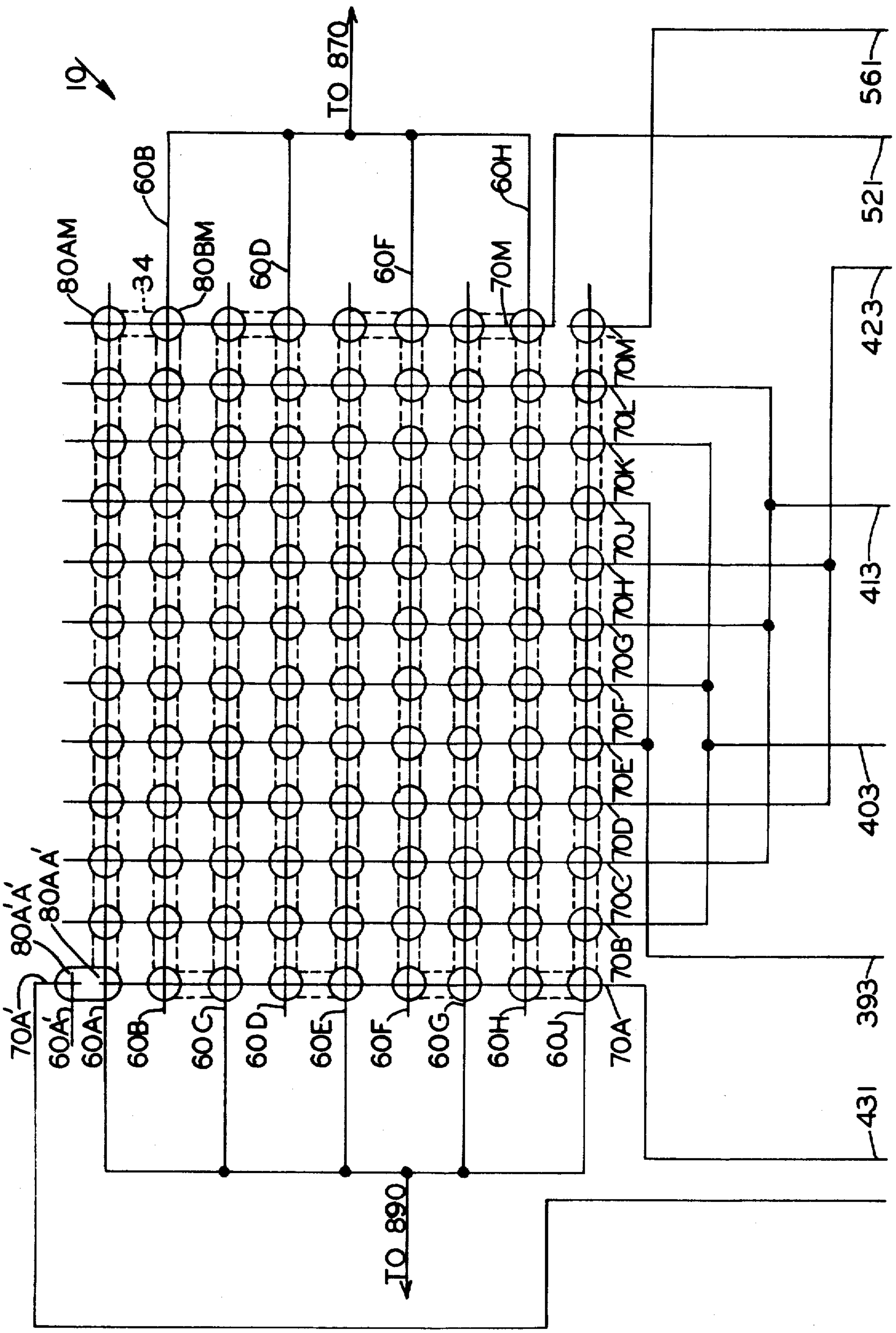
FIGS. 3A, 3B, and 3C are portions of a single schematic representation of a display panel and a system for operating the panel according to the invention.
Figure 3B:
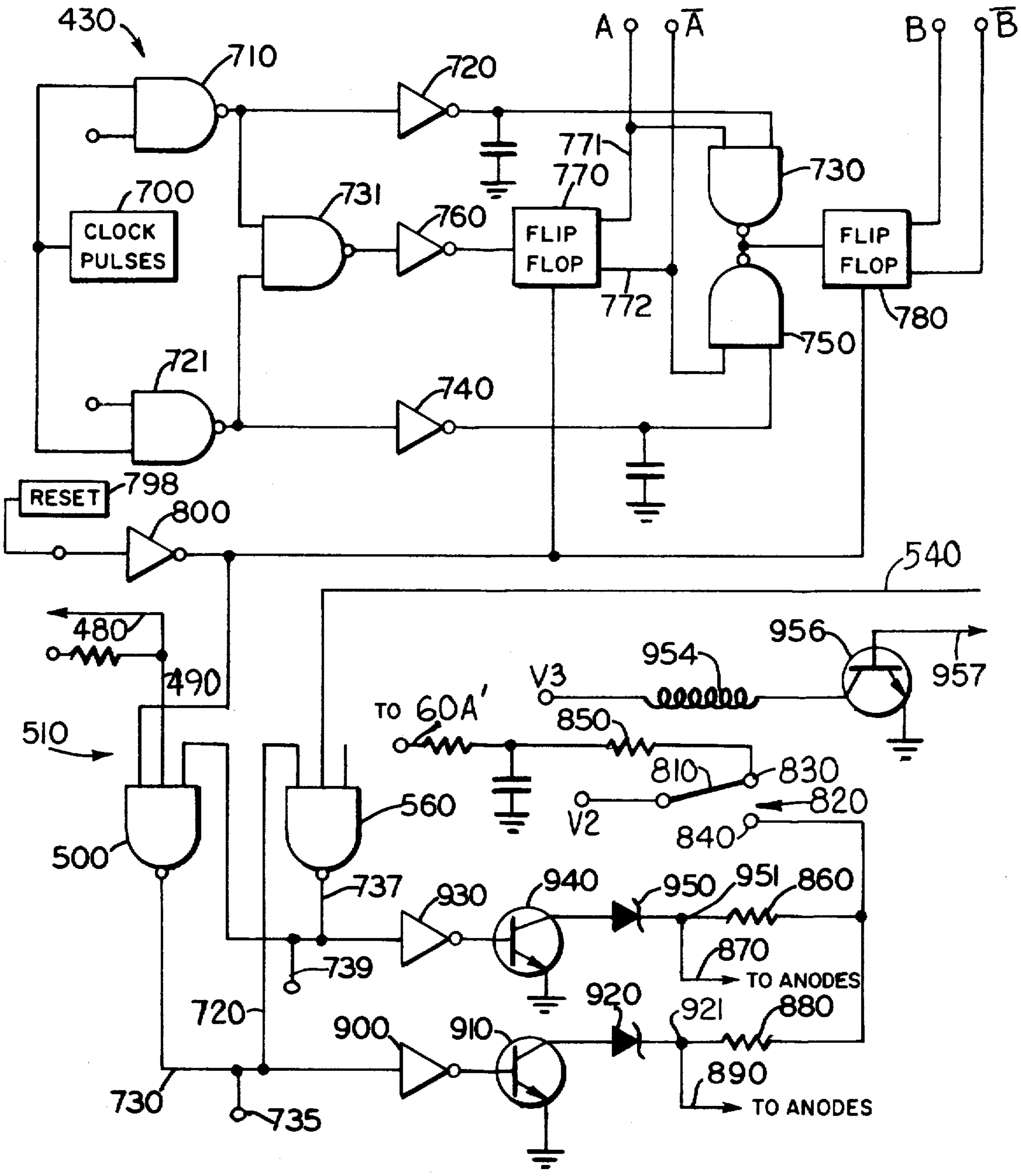
Figure 3C:
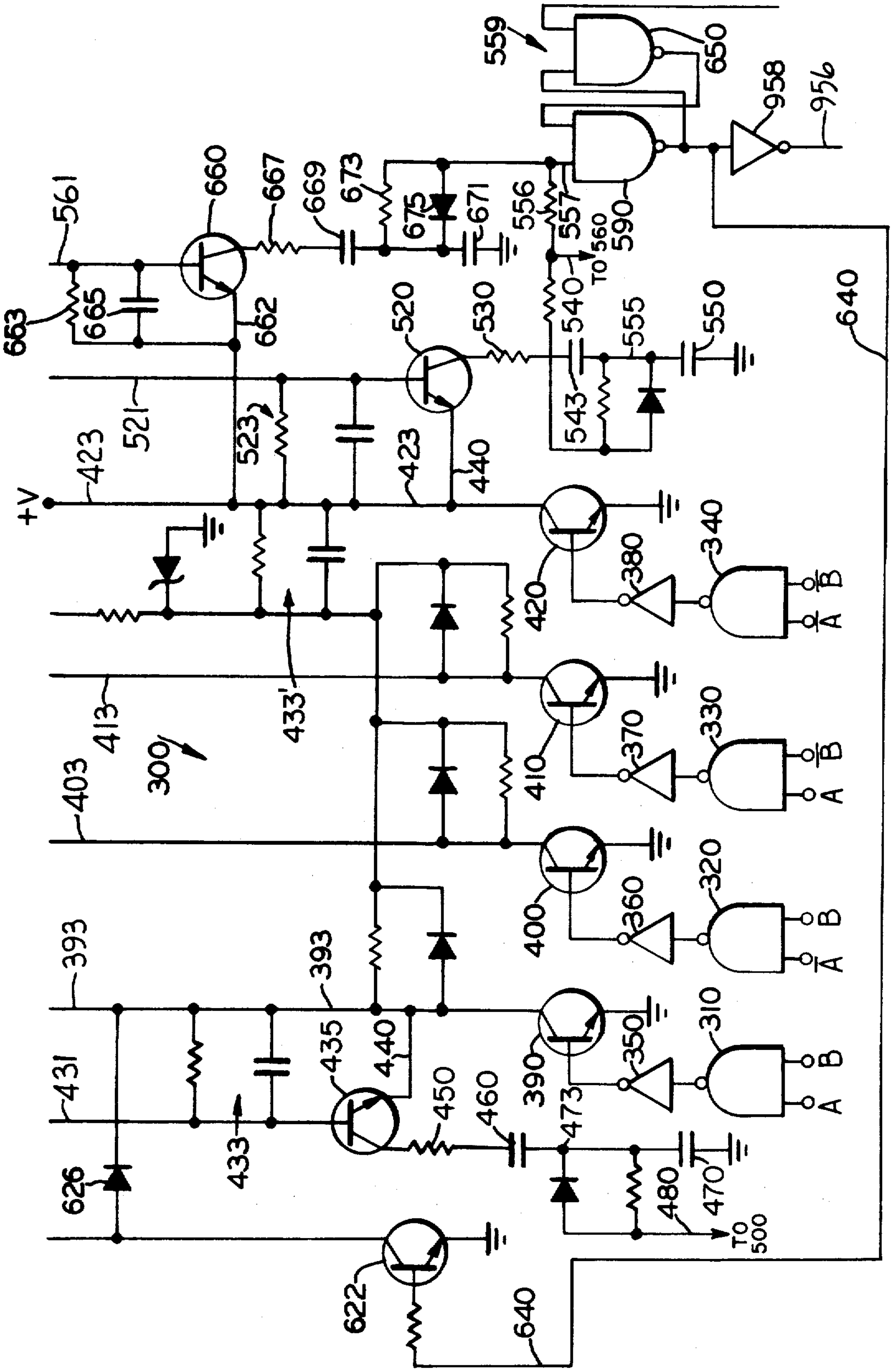

In the system of FIG. 3, the cathode groups are connected to a decoder/driver circuit 300 (FIG. 3C) which is adapted to apply operating potential to each cathode successively in forward and reverse directions. The decoder/driver circuit 300 includes four driver/logic circuits, each including an AND gate, an amplifier, and a switching transistor, connected to four groups of cathodes in panel 10. Specifically, an AND gate 310 connected through an amplifier 350 and a switching transistor 390 and lead 393 to one group of cathodes in panel 10 called phase 1($\phi 1$); AND gate 320, amplifier 360 and switching transistor 400 are connected through lead 403 to another group of cathodes in panel 10 called phase 2($\phi 2$); AND gate 330, amplifier 370 and switching transistor 410 are connected through lead 413 to another group of cathodes known as phase 3($\phi 3$); and AND gate 340, amplifier 380, and switching transistor 420 are connected through lead 423 to the remaining group of cathodes known as phase 4($\phi 4$).

The AND gates have two inputs which, for purposes of illustration, carry the logic symbols shown, and are connected to a reversible counter 430 (FIG. 3B) to be described. Switching transistor 390 of the phase 1 driver/logic circuit has its collector or output electrode connected directly by lead 393 to cathodes 70E and 70J which are in phase 1, and it is also connected through a parallel resistor-capacitor circuit 433 and lead 431 to cathode 70A to provide what is called a reverse phase 1 circuit. Similarly, switching transistor 400 of the phase 2 driver/logic circuit is connected by lead 403 directly to cathodes 70B, 70F, and 70K; switching transistor 410 of the phase 3 driver/logic circuit is connected by lead 413 directly to cathode 70C, 70G, and 70L; and switching transistor 420 is connected by lead 423 directly to cathodes 70D and 70H and through a parallel resistor-capacitor combination 433, to lead 393 connected to the output of transistor 390 and thus to the phase 1 cathodes. The emitter of transistor 435 is connected to a bus 440, and its collector is connected through resistor 450 and series capacitors 460 and 470 to ground. The junction 473 of capacitors 460 and 470 is connected through a parallel resistor-diode combination to lead 480 which is connected to lead 490 (FIG. 3B). Lead 490 is connected from a power source VI to one input of AND gate 500 which, with AND gate 560, comprises a reversing latch circuit 510. Leads 480 and 490 carry a forward set pulse to AND gate 500 in operation of the system.

The reverse phase 4 circuit referred to above includes switching transistor 520 (FIG. 3C) which has its base connected to lead 521 to cathode 70M associated with the last column of cells in panel 10 (FIG. 3A) and to lead 423 from transistor 420, and thus to the phase 4 cathodes through the parallel resistor-capacitor combination 523. The emitter of transistor 520 is connected to bus 440, and its collector is connected through resistor 530 and series capacitors 543 and 550 to ground. The junction 555 of capacitors 540 and 550 extends through lead 540, for carrying a reverse set pulse, to one input of the AND gate 560 of the reversing latch circuit 510. Junction point 555 also extends through a resistive path 556 to input 557 of one AND gate 590 of a last spot latch circuit 559 to be described.

The driver/decoder circuit 300 (FIG. 3C) also has the keep-alive cathode 70A' connected by lead 621 to the collector of a switching transistor 622 and through a diode 626, oriented as shown, to lead 393 to the phase 1 cathodes of the display panel. The base of transistor 622 is connected by lead 640 to the output of AND gate 590 and to one input of the other AND gate 650 of the last spot latch circuit 559. The output of AND gate 650 is connected to the other input of the associated AND gate 590. In the last spot latch circuit 559, the last cell cathode 70M', associated with the last cell in the raster scan (cell 80JM' in FIG. 3), is connected by lead 661 to the base of a switching transistor 660 (FIG. 3C) as shown, with the emitter thereof connected both to the phase 4 cathodes by lead 662 and 423 and to the associated base through parallel resistor 663 and capacitor 665. The collector of transistor 660 is also connected through resistor 667 and capacitors 669 and 671 to ground. The junction of the two capacitors is connected through parallel resistor 673 and diode 675 to the input 557 of AND gate 590 of the last spot latch circuit.

The system of the invention also includes reversible counter 430 (FIG. 3B) which comprises a source of clock pulses 700 coupled both to one input of a forward AND gate 710 and to one input of a reverse AND gate 721. The second input of AND gate 710 is connected to the output lead 730 and terminal 735 of AND gate 500 of reversing latch circuit 510, and the second input of reverse AND gate 721 is connected to the output lead 737 and terminal 739 of the second AND gate 560 of the reversing latch circuit 510.

The output of forward AND gate 710 is coupled (1) through an amplifier 720 to one input of AND gate 730 and (2) to one input of AND gate 731. The output of the reverse AND gate 721 is coupled (1) through an amplifier 740 to one input of AND gate 750, and (2) to the second input of AND gate 731. The output of AND gate 731 is coupled through amplifier 760 to flip-flop 770 having two output leads 771 and 772, one of which, 771, is connected to terminal A and to the inputs of AND gates 310 and 330 (FIG. 3C). Lead 771 is also connected to the input of AND gate 730, and lead 772 is connected both to terminal $\overline{A}$ to the inputs of AND gates 320 and 340 (FIG. 3C) and to the input of AND gate 750. The outputs of AND gates 730 and 750 are connected to flip-flop 780, which has one output connected to terminal B and to the inputs of AND gates 310 and 320, (FIG. 3C) and the other output to terminal $\overline{B}$ and to the inputs of AND gates 330 and 340.

A source 790 of reset pulses is coupled through an amplifier 800 (1) to flip-flop 770, (2) to flip-flop 780, (3) to one input of AND gate 500, and (4) to one input of AND gate 650 of the last spot latch circuit 559 (FIG. 3C).

Referring now to the anodes of the panel 10 and FIG. 3B, a positive power supply V2 is connected to the movable contactor 810 of an electromechanical switch 820 having two contacts 830 and 840, one of which 830 is connected through a resistive path 850 to the keep-alive anode 60A' (FIG. 3A). The other contact 840 of this switch is connected through a resistive path 860 and lead 870 to the common-connected anodes 60B, 60D, etc. and through resistive path 880 and lead 890 to the other group of anodes. In addition, the output of AND gate 500 of the reversing latch circuit 510 is coupled through amplifier 900, switching transistor 910 and Zener diode 920 to the junction 921 of resistive path 880 and lead 890 to one group of anodes. The output of AND gate 560 of the reversing latch circuit is coupled through amplifier 930, switching transistor 940 and Zener diode 950 to the junction 951 of resistive path 860 and lead 870 to the other anode group. The outputs and inputs of AND gates 500 and 560 of the reversing latch circuit are also cross-connected as shown.

The switch 820 has a relay winding 954 which is connected from a power source V3 to the collector of a switching transistor 956, which is part of the last spot latch circuit 559 (FIG. 3C) and which includes the two cross-connected AND gate 590 and 650. The output of AND gate 590 is connected (1) through an amplifier 958 and lead 957 to the base or input of switching transistor 956, (2) to one input of AND gate 650, and (3) to lead 640 to the base of transistor 622 which operates keep-alive cathode 70A'.

In operation of the system shown in FIG. 3, initially, last spot latch circuit 559 (FIG. 3C) is set so that output from AND gate 590 on line 640 turns on keep-alive switching transistor 622, and this applies operating potential to keep-alive cathode 70A'. At the same time, the output of AND gate 590 operates through amplifier 958 and lead 957 and turns on transistor 956, and current flows through relay coil 954. This moves arms 810 of switch 820 into contact with contact 830 so that positive anode potential is applied from source V2 through resistive path 850 to the keep-alive anode 60A', and thus keep-alive cell portion 80A'A' fires. Next, the reset circuit (FIG. 3B) is operated, and the pulse provided by source 790 and amplifier 800 sets the last spot latch 559 to de-energize relay coil 954 and release arm 810 from contact with terminal 830 into contact with terminal 820, and this causes a positive anode voltage to be coupled from source V2 to the resistive paths 860 and 880. The set of anodes which receives anode potential is determined by the reset pulse which is also applied to AND gate 500 of reversing latch circuit 510, and this circuit is set so that switching transistor 910 is off, and this permits anode potential to be applied through lead 890 to the group of anodes including anode 60A. At this time, transistor 940 is ON and anode potential is blocked from the other anodes. When the last spot latch 559 is set by the reset pulse, coupled to AND gate 650, the output of AND gate 590 cuts off the keep-alive transistor 622 and thus removes operating potential from the keep-alive cathode 70A'. However, the reset pulse source 790, when operated, applies a reset pulse to flip-flops 770 and 780 to set them so that the logic output turns on switching transistor 390. This applies operating potential to the phase 1 cathodes from the collector of transistor 390. Since this collector is also connected to the keep-alive cathode 70A' through diode 626, operating potential is maintained on cathode 70A' and glow expands to cell portion 80AA' which is the first cell in the scanning cycle.

The reversing latch AND gates 500 and 516 are also set by the reset pulse so that the output therefrom energizes the forward AND gate 710 of the reversible counter 430 by the connection from terminal 735 to the noted input terminal of AND gate 710.

Now, the clock pulse source 700 is operated, and each clock pulse switches the flip-flops 770 and 780 and each of the transistors 400, 410 and 420, and their different cathode phases are operated in turn so that operating potential is applied to each cathode 70 in turn. With anode potential still on anode 60A, each cell 80 in the first row is fired in turn until a glow reaches cell 80AM operated by cathode 70M and phase 4. When transistor 420 fires and operates phase 4, operating potential is coupled through R-C circuit 523 and lead 521 to cathode 70M, and this causes cell 80AM to fire. This also operates switching transistor 520 of the reverse phase 4 circuit to produce a pulse on lead 540 (FIG. 3C) which switches the reversing latch AND gates 500 and 560 (FIG. 3B) to turn off transistor 940 and to turn on transistor 910 and thus switch anode potential from the first anode 60A and its group to the second anode 60B and its group. When anode 60B receives operating potential and 60A loses it, cathode phase 4 is still ON and glow transfers from cell 80AM through slot 34 to cell 80BM. The switching of the AND gates 500 and 560 also switches the forward and reverse AND gates 710 and 720 of the reversible counter to energize the reverse count portion thereof.

Now, the clock input operates the cathode phases in the reverse direction from phase 4 to phase 3 to phase 2, etc., and the cells in the second row fire one at a time from cell 80BM to the left to cell 80BA. When the last cell in the second row 80BM fires, switching transistor 435 is turned on and operates through lead 480 to switch the reversing latch to switch anode potential to apply anode potential to anode 60C. With cathode potential applied still to cathode 70A through lead 431, glow transfer from cell 80BM through slot 3 and to cell 80CA. This operation also operates through terminal 735 (FIG. 3B) to the reversible counter again to energize the forward count portion thereof. Now, the scan proceeds to the right along the third row of cells.

This operation is repeated until the scan reaches the last row and the last phase 4 operation at cell 80JM'.

When the last anode 60J is energized and the cells along the bottom row are scanned, when cell 80JL is reached due to the operation of phase 3, then, when phase 4 operates and transistor 420 turns on, its collector goes to ground, and this ground potential is coupled through lead 662 and resistor 663 to lead 561 which is connected to cathode 70M'. Thus, cell 80JM' turns on and current flows through switching transistor 660. This current flow discharges the capacitor 669 and causes the last spot latch 559 to switch so that a pulse is coupled through lead 640 which turns on transistor 622. This applies operating potential to cathode 70A'. In addition, the last spot latch operates through amplifier 958 and switching transistor 956 to operate relay coil 954 which causes contact 810 to contact terminal 830, which operation connects anode potential to the keep-alive anode 60A'. This causes the keep-alive cell 80A'A' to turn on and prepare the panel for another cycle of operation. The entire cycle of operation is again repeated by the application of a reset pulse form source 790.

In the type of panel illustrated in FIGS. 1 and 2, as the cells 80 are scanned and fired, glow can be seen by a viewer looking through cover plate 90.

The cell-scanning principles of the invention may also be embodied in other types of display panels such as the two-layer panel described in Ser. No. 350,984 and illustrated as panel 10' in FIG. 4, and a three-layer memory panel described in Ser. No. 38,409, filed May 18, 1970, and illustrated in FIG. 5 as panel 10''. In panel 10', in addition to the scanning structure shown in FIGS. 1 and 2, the panel sandwich includes an apertured plate 1000 and display anodes 1001, with the apertures 1002 in plate 1000 comprising display cells, one such cell being associated with each scanning cell 80. A display anode is associated with each column of display cells. If, as the cells 80 are scanned as described above, suitable positive potentials are applied to a display anode 1001, then the display cell associated with a fired scanning cell is itself fired. The total number of display cells fired represents a character or message determined by input data signals applied to the display anodes.

Figure 5:
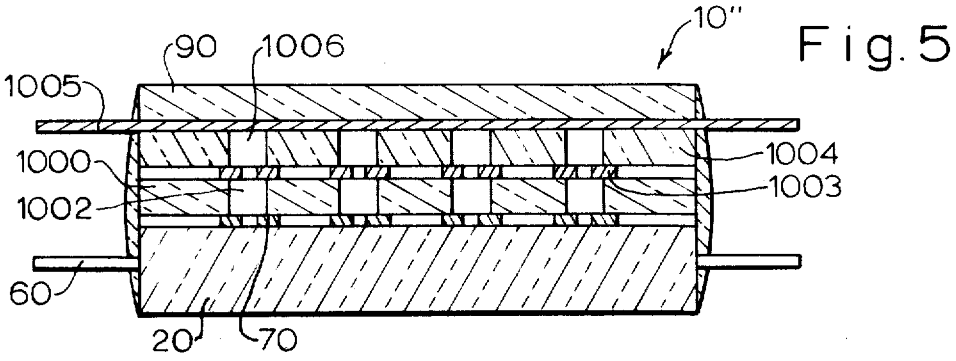
FIG. 5 is a sectional view of another modified panel embodying the invention.

The panel 10'' illustrated in FIG. 5 includes the above-described cell-scanning structure and, in addition, and in order from bottom to top, apertured plate 1000, apertured strip electrodes 1003, an apertured plate 1004, and display anodes 1005. In this type of panel, as scanning cells 80 are scanned, display cells 1006 in plate 1004 can be fired by applying suitable potentials between electrodes 1005 and 1003, and, in addition, the pattern of glow in display cells can be sustained by the application of sustaining signals, either D.C. pulses or an A.C. signal between electrodes 1005 and 1003.

What is claimed is:

1. A display system comprising a display panel having a plurality of glow cells arrayed in a series of rows and a series of columns, each column having a scanning cathode, there being a series of scanning cathodes including a first cathode, intermediate cathodes, and a last cathode, each row of cells having a scanning anode, the rows of cells being connected together in series by means of gas communication channels which extends from cell to cell along each row of cells and from row to row by means of a link between appropriate portions of adjacent rows so that all of the cells are connected in a continuous series which extends in a forward direction along the first row of cells, in a reverse direction along the second row of cells, in the forward direction along the third row of cells, in the reverse direction along the fourth row of cells, etc., a first circuit means coupled to each anode electrode for applying operating potential thereto and including anode switching means for switching operating potential from one anode to the next adjacent anode, first, second, third, and fourth cathode operating circuit means connected to said cathodes and adapted to apply operating potential to each cathode in turn through the series of cathodes beginning with the first and terminating with the last, a reversible counter coupled to said first, second, third, and fourth cathode operating circuits and adapted to energize them separately and in turn in forward and reverse directions, reversing circuit means connected (1) to said first circuit means to switch operating potential from one anode to another and (2) to said reversible counter for reversing its direction of operation, and second circuit means connected from said first cathode operating circuit to said reversing circuit means, and third circuit means from said fourth cathode operating circuit to said reversing circuit means whereby, when the first cell in all but the first row of said panel is energized due to the operation of its cathode operating means, said reversing circuit is operated to switch said anode switching means and the direction of operation of said reversible counter, and when the last cell in each row, but not the last cell in the series, is energized due to the operation of its cathode operating means, said reversing circuit is operated to switch said anode switching means and the direction of operation of said reversible counter.

2. The system defined in claim 1 and including in said panel an auxiliary starter cell having anode and cathode electrodes and positioned in operative relation with said first cell in the series, and fourth circuit means coupled between said last cell in said series and said auxiliary cell for automatically energizing said auxiliary cell when said last cell is fired, said fourth circuit means also being coupled to said anode switching means and to said reversible counter for changing its direction of operation.

3. A display system comprising a display panel having a plurality of gas-filled glow cells arrayed in a series of rows and a series of columns, each row of cells having a left end and a right end, the cells in each row being in gas communication with each other, and one end of each row of cells being in gas communication with the adjacent end of the adjacent row of cells, the interconnections of the rows of cells being alternately between left ends and right ends thereof whereby the cells of said panel are connected in continuous series with respect to gas communication with each other, said series including a first cell, intermediate cells, and a last cell, a scanning cathode electrode aligned with each column of cells, and a scanning anode electrode aligned with each row of cells, an auxiliary cell adjacent to and in gas communication with said first cell and having its own cathode and anode electrodes, first circuit means coupled to said anode electrodes for applying operating potential to each separately and in turn, second circuit means coupled to said cathode electrodes for applying operating potential to each in turn as each anode has operating potential applied to it whereby each cell in each row is caused to fire separately and in turn until the entire series has been fired, and third circuit means coupled between the last cell in the series and said auxiliary cell for automatically firing said auxiliary cell when the last cell has been fired to prepare the panel to execute another scan of said series of cells.

4. The system defined in claim 3 wherein said auxiliary cell and said first cell in the series are in direct gas communication with each other and said cells have a common cathode and separate anodes.

5. The system defined in claim 3 wherein said second circuit means includes a reversible counter adapted to operate in forward and reverse directions, operation in the forward direction serving to apply operating potential to said series of cathodes in the forward direction thereby turning on each cell in a selected row in the forward direction, and operation in the reverse direction serving to apply operating potential to said series of cathodes in the reverse direction thereby turning on each cell in a selected row in the reverse direction.

6. The system defined in claim 3 wherein said second circuit means includes a reversible counter adapted to operate in forward and reverse directions, operation in the forward direction serving to apply operating potential to said series of cathodes in the forward direction thereby turning on each cell in a selected row in the forward direction, and operation in the reverse direction serving to apply operating potential to said series of cathodes in the reverse direction thereby turning on each cell in a selected row in the reverse direction, the row of cells being selected by the anode which has operating potential applied to it.

7. The system defined in claim 3 wherein said anode electrodes are connected alternately in a first group and a second group, with every other anode being in the same group, and said first circuit means including means for switching operating potential from said first group of anodes to said second group of anodes.

8. A display system comprising a display panel having a plurality of gas-filled glow cells arrayed in a series of rows and a series of columns, each row of cells having a left end and a right end, the cells in each row being in gas communication with each other, one end of each row of cells being in gas communication with the adjacent end of the adjacent row of cells, the interconnections of the rows of cells being alternately between left ends and right ends thereof whereby the cells of said panel are connected in continuous series with respect to gas communication with each other, said series including a first cell, intermediate cells, and a last cell, a scanning cathode electrode aligned with each column of cells, and a scanning anode electrode aligned with each row of cells, said anode electrodes being connected in two sets with alternate anodes being in a set, an auxiliary cell adjacent to and in gas communication with said first cell and having an anode and cathode electrode, a first source of anode operating potential coupled through a switch to the anode electrode of said auxiliary cell, said switch including means for disconnecting said potential from said anode of said auxiliary cell, a reversible counter and a source of clock pulses coupled thereto, a second source of anode operating potential, a two-part gate coupled through separate circuits to said sets of anode electrodes for coupling potential from said second source to one set of anodes or the other and including circuit connections to said reversible counter, the output of said reversible counter being connected through a plurality of logic circuit elements to said cathode electrodes to apply operating potentials to each of said cathode electrodes in turn, both in forward and reverse directions as required, to cause said rows of cells to be scanned, the electrodes of said last cell in said series being coupled through a two-part gate, both to said switch to said first source of potential and to the anode of said auxiliary cell, and a reset circuit coupled to all of said circuit elements to set them in proper operating condition at the beginning of a scanning cycle of operation.

* * * * *